United States Patent [19]
Brown et al.

[11] Patent Number: 5,894,210
[45] Date of Patent: Apr. 13, 1999

[54] CONTROL OF A SWITCHED RELUCTANCE MACHINE

[75] Inventors: Geoffrey Thomas Brown, Hemingbrough; Michael James Turner, Headingley, both of United Kingdom; Pol Remi Avet, Anzegem, Belgium

[73] Assignee: Switched Reluctance Drives Ltd., Harrogate, United Kingdom

[21] Appl. No.: 08/684,256

[22] Filed: Jul. 19, 1996

[30] Foreign Application Priority Data

Jul. 25, 1995 [GB] United Kingdom ............... 9515239
Mar. 19, 1996 [GB] United Kingdom ............... 9605724

[51] Int. Cl.$^6$ ............................................................ H02P 1/46
[52] U.S. Cl. ........................... 318/701; 318/806; 318/138; 318/254; 318/439
[58] Field of Search ............................... 318/701, 806, 318/138, 254, 439

[56] References Cited

U.S. PATENT DOCUMENTS

| | | | |
|---|---|---|---|
| 3,932,793 | 1/1976 | Muller | 318/254 |
| 4,661,756 | 4/1987 | Murphy et al. | 318/701 |
| 5,012,171 | 4/1991 | Sember | 318/560 X |
| 5,329,217 | 7/1994 | Kerkman et al. | 318/806 X |
| 5,469,039 | 11/1995 | Stephenson et al. | 318/701 |

*Primary Examiner*—Karen Masih
*Attorney, Agent, or Firm*—Arnold, White & Durkee

[57] ABSTRACT

A normalization circuit for a phase energization controller receives a rotor position value from a position encoder, and the normalization circuit obtains a normalized rotor position for each phase of a switched reluctance machine. Accordingly, the normalization circuit simplifies the detection of commutation positions for all the machine phases by reducing the commutation position determination to that of a single phase. Also, an initialization circuit for the phase energization controller energizes one or more phases of the switched reluctance motor to set the rotor of the switched reluctance motor to a preferred position to determine an offset value.

37 Claims, 14 Drawing Sheets

CONTROL OF A SWITCHED RELUCTANCE MACHINE

FIELD OF THE INVENTION

The present invention generally relates to a controller for and a method of controlling a switched reluctance machine using signals received from a position encoder. More particularly, the present invention relates to a phase energization controller and method for controlling a switched reluctance machine using normalization circuitry and signals from a position encoder to give the angular position of the rotor of the machine.

BACKGROUND OF THE INVENTION

The switched reluctance machine is a simple electric machine with no electrical conductors or permanent magnets on the rotating part and only simple, switched coils, often carrying only unidirectional currents, on the stator. This attractive combination of a simple machine, coupled with the rapidly evolving capabilities and falling costs of power-electronic switches and control electronics has led to the continued development of switched reluctance drives.

FIG. 1 shows the principal components of a switched reluctance drive system 10. The input power supply 12 can be either a battery or rectified and filtered mains. The DC voltage provided by power supply 12 is switched across the phase windings of the machine 14 by the power converter 16 under the control of the electronic control unit 18. The switching must be correctly synchronized to the angle of rotation of the rotor for proper operation of the drive 10. As such, a simple rotor position encoder 20 is typically mounted on the machine shaft 22 to supply position signals to the controller 18 for determining the absolute angular position of the rotor. The encoder 20 can also be used to generate a speed feedback signal in the controller 18. FIG. 1 shows this being utilized to give closed-loop speed control.

FIG. 2 shows the elements of a typical four-phase switched reluctance machine 14. The machine 14 has eight salient poles 26a–h on the stator 28 and six poles 30a–f on the rotor 32. Each stator pole 26a–h carries a simple exciting coil 34a–h Opposite coils 34a and 34e, 34b and 34f, 34c and 34g, and 34d and 34h are connected to form the north/south pole pairs for the four "phases." Only one phase circuit 36 is shown for the opposite coils 34a and 34e. The opposite coils 34a and 34e are excited from a dc supply 38 through two switches or transistors (S1 and S2), and two diodes (D1 and D2) allow energy to return to the supply 38. Other switching circuits are well known in the art.

If it is desired to operate the machine as a motor, torque is developed in the machine 14 by the tendency for the magnetic circuit to adopt a configuration of minimum reluctance, i.e., for an opposing pair of rotor poles 30a and 30d, 30b and 30e, and 30c and 30f to be pulled into alignment with an excited pair of stator poles 26a–h, maximizing the inductance of the exciting coils 34a–h. By switching the phases in the appropriate sequence, the rotor 32 will continuously rotate in either direction so that torque is developed continuously in the appropriate direction. Moreover, the larger the current supplied to the coils 34a–h, the greater the torque. Conversely, if it is desired to operate the machine as a generator, the coils are excited as the motor poles move away from the stator poles. Power is then transferred from the shaft of the machine to the electrical supply.

FIG. 3 shows a rotor pole 41 approaching a stator pole 39 according to arrow 35 for the switched reluctance machine 14 of FIG. 2. FIG. 4 shows the phase circuit 47 for opposite coils 40 as partially depicted in FIG. 3. As the rotor pole 41 approaches the stator pole 39, an energization cycle commences for the phase associated with stator pole 39. When leading edge of the rotor pole 41 reaches position 36, represented by absolute rotor angle $\Theta1$ ("on angle"), the phase transistors 44 are turned on, and the DC supply 42 is applied to the opposite coils 40, causing flux to build up. Consequently, the stator pole 39 attracts the rotor pole 41, thereby producing torque. When the rotor pole 41 reaches an absolute rotor position 37, represented by absolute rotor angle $\Theta2$ ("freewheel angle"), only one transistor 44 is turned off. This causes the current to "freewheel" around the other transistor 44 and leads to an approximately constant-flux condition. When the rotor pole 41 reaches absolute rotor position 38, represented by absolute rotor angle $\Theta3$ ("off angle"), both phase transistors 44 are held in the off state, and diodes 46 conduct, placing a voltage of reverse polarity across the winding and causing flux to decay to zero.

The on, freewheel, and off positions discussed above represent typical commutation points in the energization cycle for each phase of a switched reluctance machine. These three angles are controlled by the controller 18 to control the torque. The relationship between the angles and the torque is a nonlinear function of torque and speed. The controller 18 may interpolate from a look-up table of measured settings to obtain and update the proper commutation points for each phase of the switched reluctance machine.

Previous switched reluctance systems used a simple angular position sensor to control the energization of the motor phases. Typically, the sensor gives one pulse per phase for each energization cycle of the motor. The timing markers derived from the sensor are interpolated electronically to obtain adequate resolution. The advantage of this system is the low sensor cost. However, a substantial disadvantage exists with respect to the lack of information provided when running at slow speeds or high acceleration rates.

Absolute position encoders (e.g., resolvers, optical encoders) have been widely used in high performance drive systems for many years, particularly for position control systems. Absolute position encoders give angular resolution sufficient to remove the need for interpolation of angles, but, especially for higher resolution encoders, the absolute position encoders require more hardware, more software, or both to make adequate comparisons between the absolute rotor position and the required commutation points.

For the switched reluctance drive of FIG. 2, each phase undergoes six energization cycles per rotor revolution, one for each rotor pole. Since each energization cycle has three commutation positions (on, off, and freewheel), each phase requires eighteen comparisons between these required positions and the actual rotor position. For four-phase machine, this requires a total of seventy-two such comparisons. Such an arrangement would require seventy-two sets of, e.g., the circuitry of FIG. 5 which uses a twelve-bit resolver word. FIG. 5 includes a twelve-bit latch 49 storing a predetermined absolute rotor position, and a twelve-bit comparator 50 for comparing the predetermined absolute rotor position with the high resolution, absolute rotor position from the position encoder or resolver 48. These techniques are standard and are well known by those skilled in the art. Other implementations would be possible.

SUMMARY OF THE INVENTION

It is an object of the invention to provide a method and circuitry for more efficiently and accurately detecting the various commutation points for the phases of a switched reluctance motor.

The present invention uses an absolute position encoder to directly determine the absolute rotor positions which define the commutation positions for a switched reluctance machine.

In accordance with one aspect of the present invention, a normalization circuit for a phase energization controller receives an absolute rotor position value from an absolute position encoder, and the normalizing circuit produces a normalized rotor position for a current phase of a switched reluctance machine having a plurality of phases. Accordingly, the normalizing circuit simplifies the detection of commutation positions for all the machine phases by reducing the commutation position determination process to that of a single phase.

In accordance with another aspect of the present invention, an initialization circuit energizes one or more phases of the switched reluctance machine to set the rotor of the switched reluctance machine to a known position. When the rotor is at the known position, the initialization circuit reads the position encoder to obtain an initial rotor position value. Thereafter, the initialization circuit subtracts the initial rotor position value from the then current rotor position value for determining a corrected rotor position.

BRIEF DESCRIPTION OF THE DRAWINGS

Other aspects and advantages of the present invention may become apparent upon reading the following detailed description of exemplary embodiments of the invention and upon reference to the drawings in which.

DETAILED DESCRIPTION OF THE INVENTION

Illustrative embodiments of the invention are described below as they might be implemented using the normalization and initialization circuitry and methods to create simpler, more efficient commutation angle detection for the phases of a switched reluctance drive.

The present invention uses a normalization circuit to simplify phase calculations. The normalization circuit normalizes the absolute rotor position value by effectively adding or subtracting an offset according to the phase being considered, the part of the mechanical revolution being considered, the desired direction of torque, and the motor direction. The normalization circuit can obtain the normalized rotor position by using logical arithmetic techniques, or by storing all the offsets in a storage device.

Figure 6A:
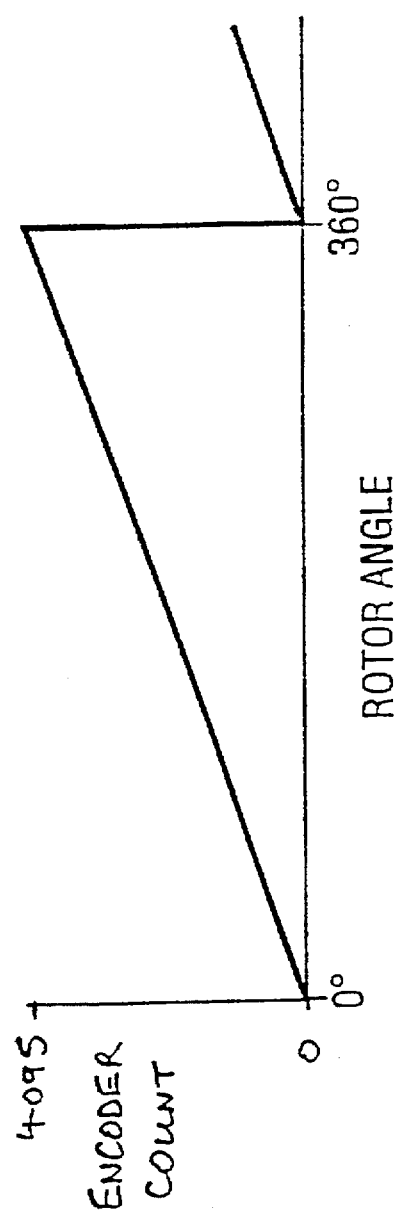
FIGS. 6a and 6b show graphs of encoder output against absolute rotor angle.
Figure 6B:
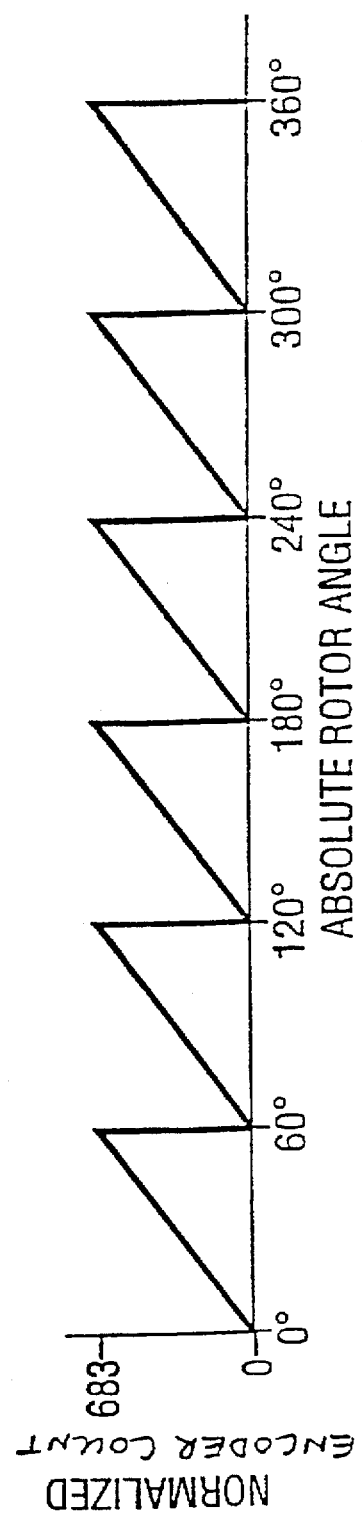

The first stage of the normalization process is to reduce the angle comparison circuit to that of one electrical cycle, which is feasible because each electrical cycle is identical as far as the angle control system is concerned. Thus, in a machine with six electrical cycles in one mechanical cycle, the comparison circuits are reduced by a factor of six. FIG. 6a shows the variation of encoder count with rotor angle. FIG. 6b shows the normalized encoder count produced as a result of this stage of the process. The technique used to achieve this will be described below.

The second stage of the normalization process is to add an offset to the encoder word for each machine phase. This permits the same logic set to be used to determine the required commutation positions for the phases, provided each phase is processed in turn (i.e. by time division multiplexing).

Figure 7A:
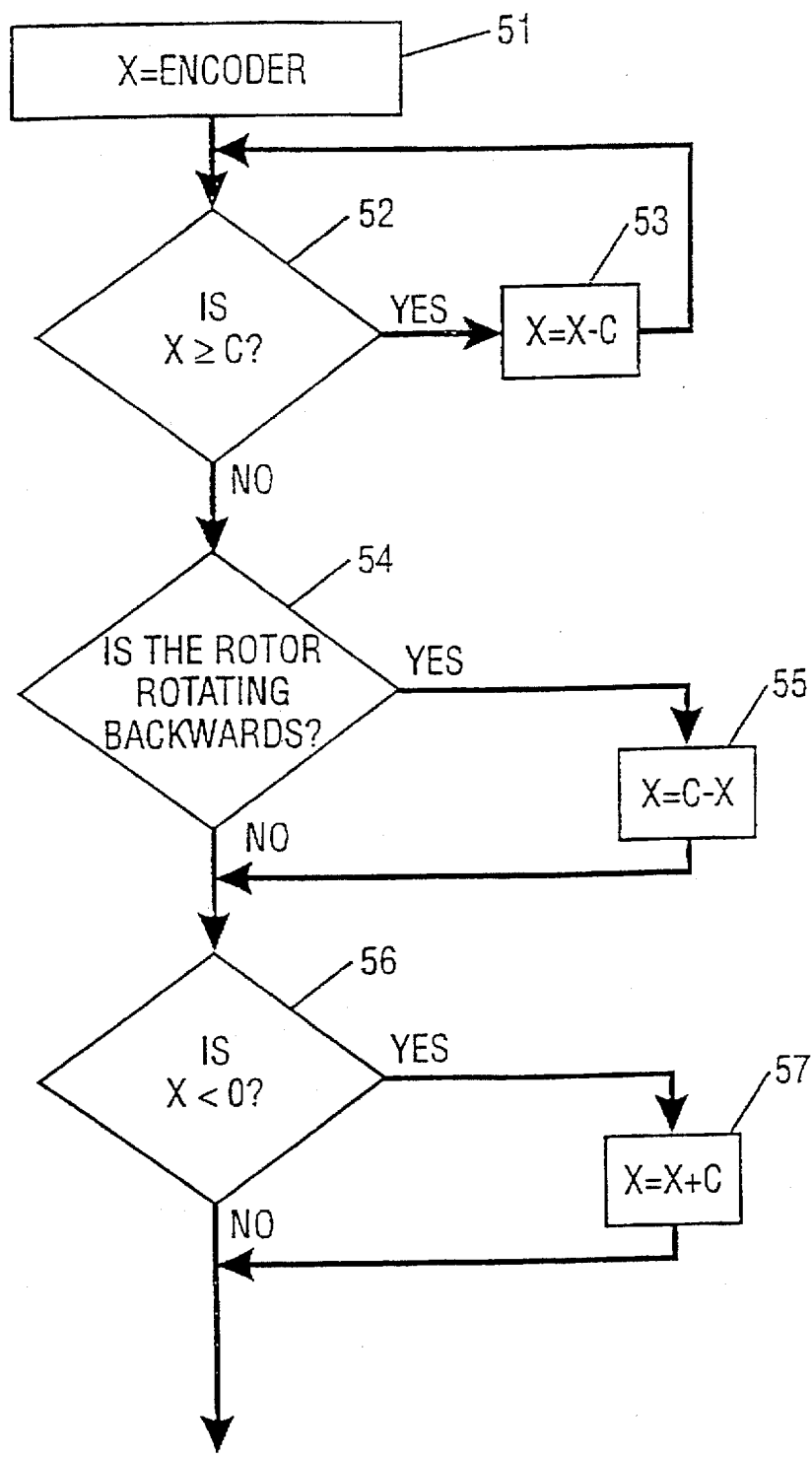
FIGS. 7a–c show a flow chart which represents the normalization process.
Figure 7B:
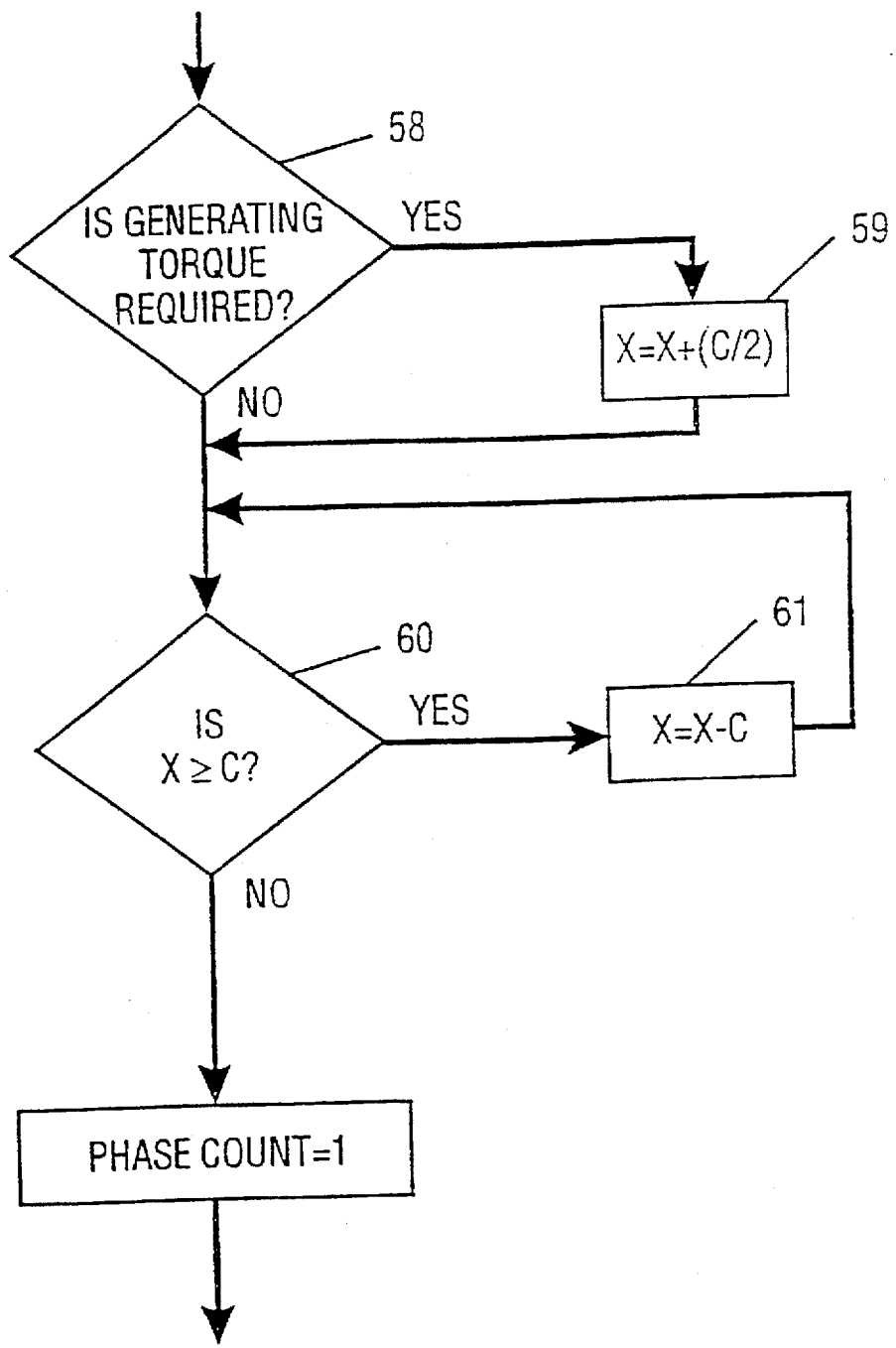
Figure 7C:
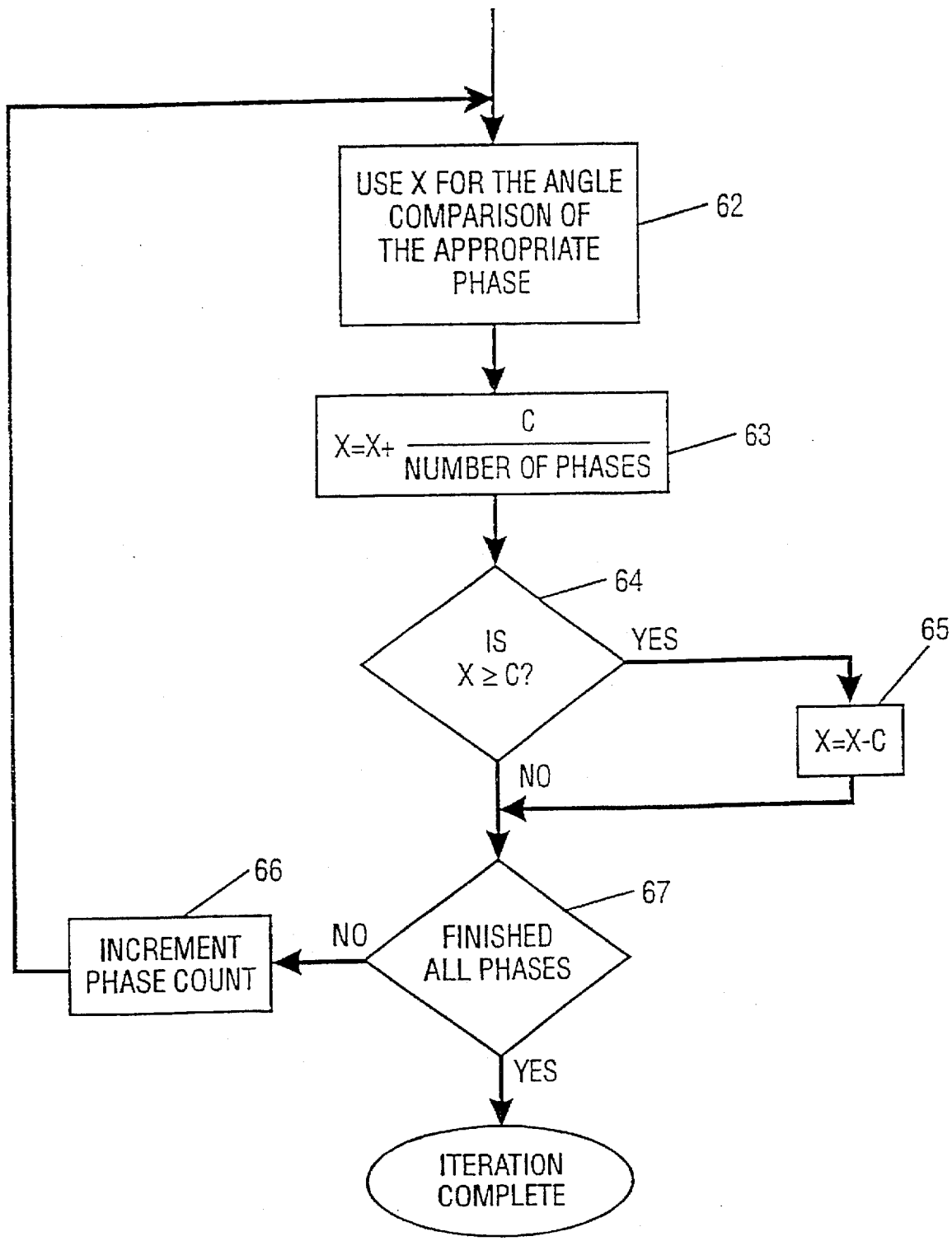

The entire normalization process is represented in the flowchart of FIG. 7. Operations are performed on the processed encoder value, X, and the number of encoder counts in one electrical cycle, C.

The normalizing process first limits the range of the encoder to one electrical cycle of the machine. This is accomplished at steps 52 and 53. Step 52 compares X to C to ascertain whether the processed encoder value is greater than the number of counts in an electrical cycle. If it is, repeated subtractions are performed at step 53 where the number of encoder counts in an electrical cycle, C, is subtracted from the encoder value until the processed encoder value is less than C. Simplifications of this process may occur in practical machines. For instance, in a three-phase machine with eight rotor poles there are eight electrical cycles in a mechanical cycle. Since eight is a binary power, normalization can be achieved by simply discarding the three most significant bits of the encoder word.

Next, allowance must be made for the direction of motor rotation. If this is not done, then the encoder value would decrease if the motor is rotated backwards; such an occurrence presents significant problems in determining the commutation angles. Step 54 determines whether the motor is rotating backwards. If this occurs, then the encoder count is subtracted from the count corresponding to a complete electrical cycle at step 55. The result is again normalized at steps 56 and 57 to one electrical cycle, this time by adding a cycle if the result is negative. Again, a possible simplification can be introduced in a three-phase motor since, in that case, an electrical cycle is a power of two: the reverse direction can be accommodated by a 2's complement operation, and requires only the most significant bits to be discarded to allow for underflow.

In conventional switched reluctance drives where a simple rotor position transducer is used, it is normal to allow for a generating operation by inverting the signals from the sensors of the rotor position transducer. This moves the timing points by half an electrical cycle. The flowchart of FIG. 7 performs the same operations at steps 58 and 59 to permit operating the machine as a generator. The processed encoder count is then normalized to one electrical cycle at steps 60 and 61 by subtracting a complete cycle if the value is greater than C. One embodiment of this process can be simply achieved on a four-phase machine by interchanging the commutation signals for alternate phases.

Figure 1:
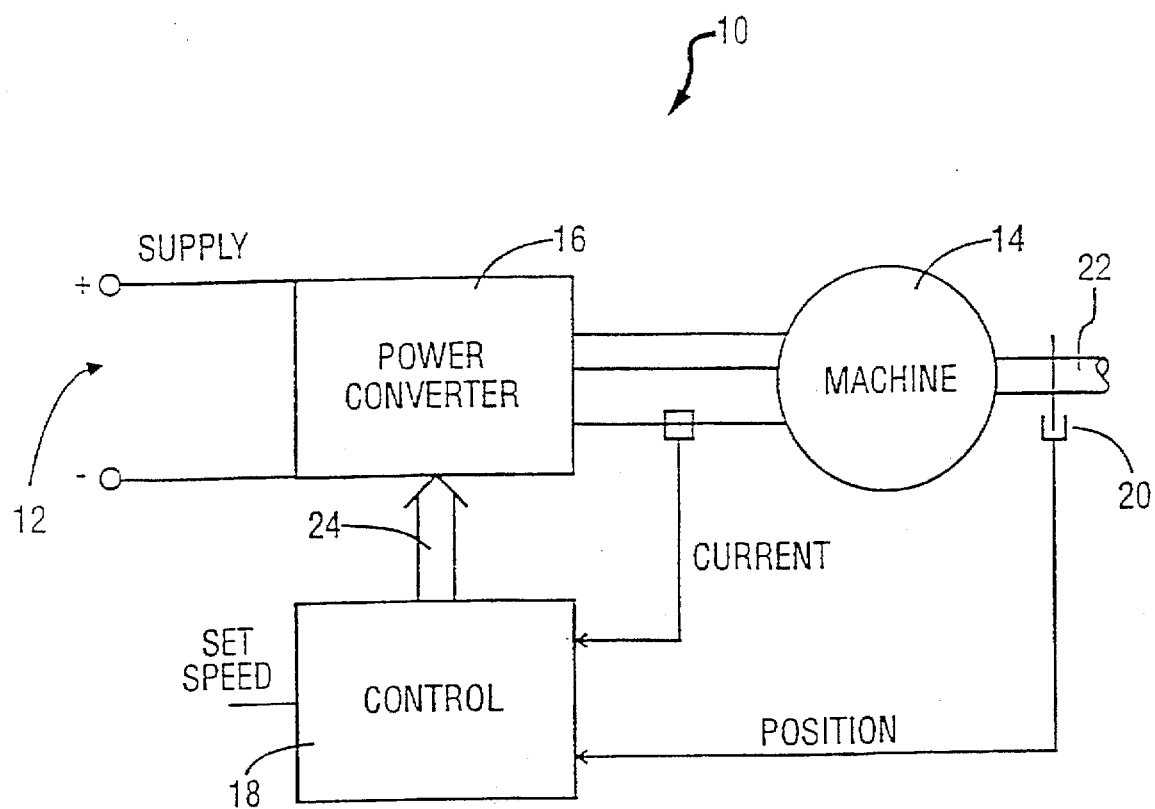
FIG. 1 is a block diagram of the principal components of a switched reluctance drive system.
Figure 2:
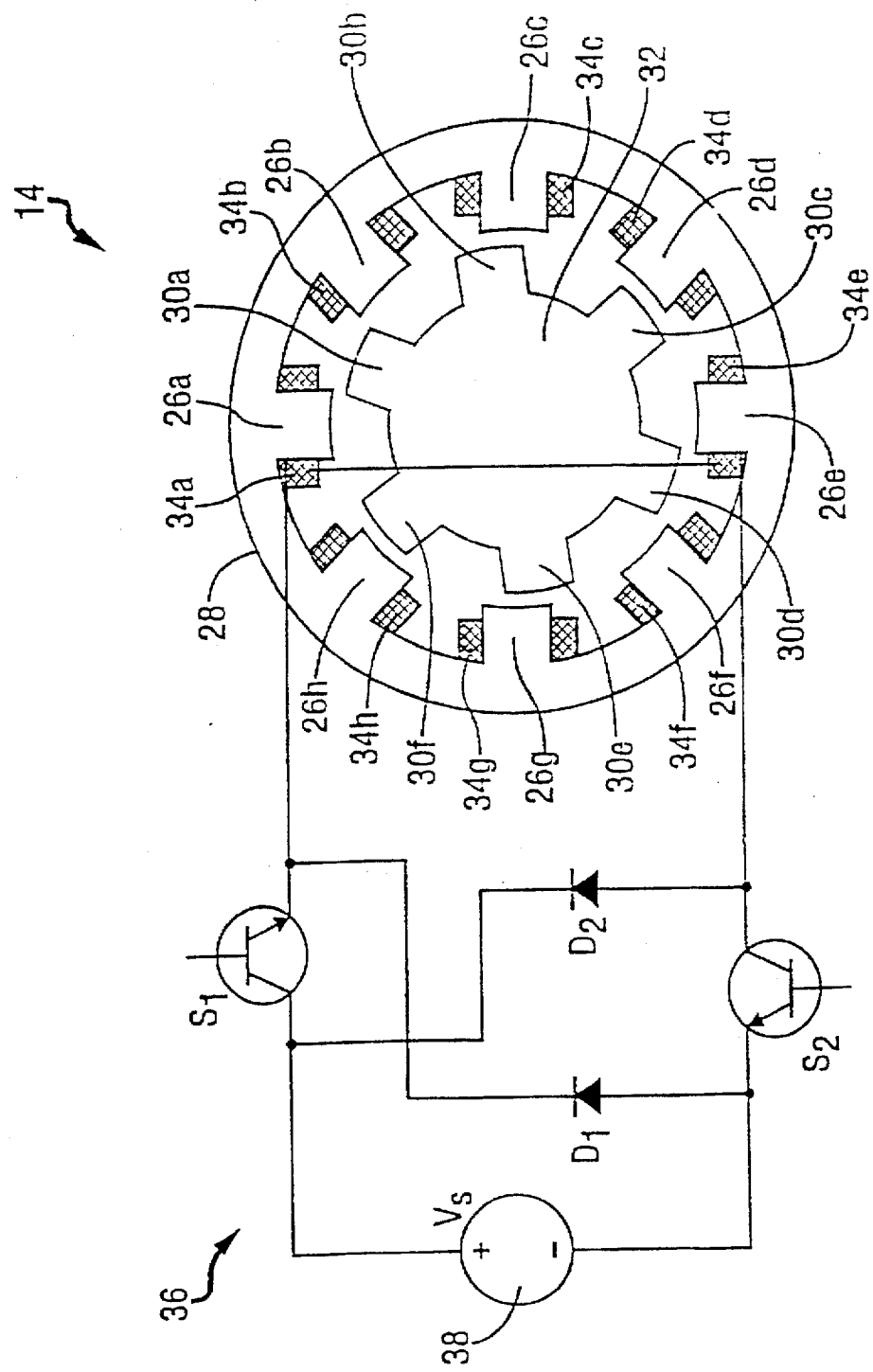
FIG. 2 is a drawing of a typical four-phase switched reluctance machine with the energization circuit shown for one phase.
Figure 3:
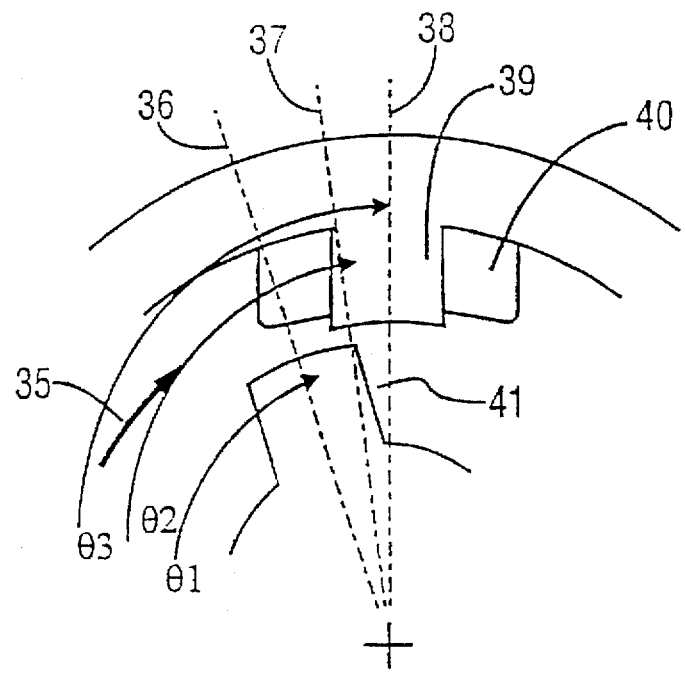
FIG. 3 is a diagram of a rotor pole approaching a stator pole and the commutation points for the phase associated with the stator pole.
Figure 4:
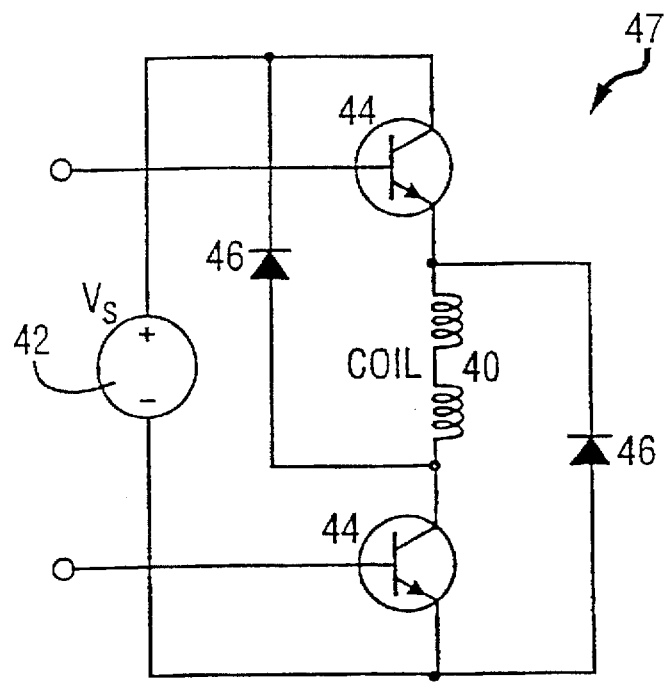
FIG. 4 is a schematic diagram of the phase circuit for the phase associated with the stator pole of FIG. 3.
Figure 5:
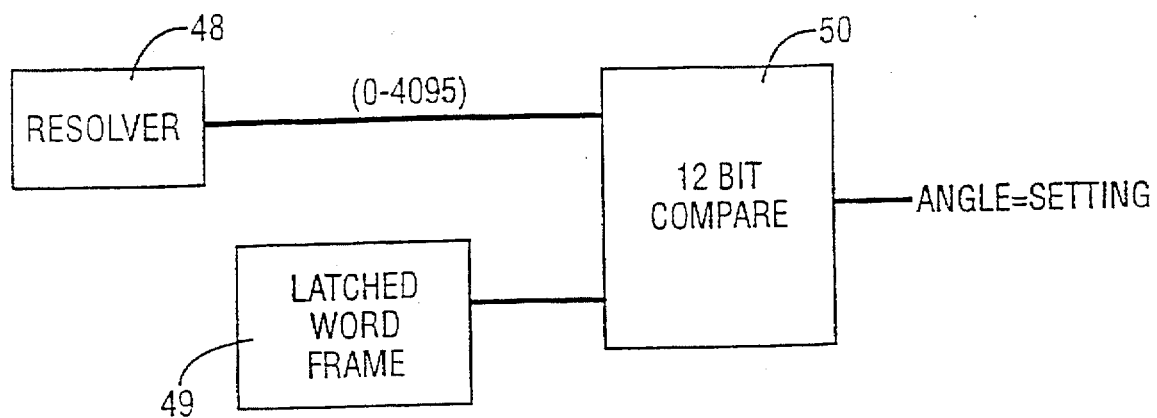
FIG. 5 is a block diagram of one of the 72 sets of comparison circuitry required for detecting the 72 absolute rotor positions representing the commutation points per rotor revolution of the four-phase machine of FIG. 2.

At step 62 in the flowchart of FIG. 7, the processed encoder value is correct for one phase, assuming the encoder is aligned with the reference phase. Hence, the value of X may be used in the angle comparison circuitry to determine the desired state of the switches in the power conversion circuit, e.g. as shown in FIG. 4.

The offsets for the remaining machine phases are added at step 63. In each case the offset is added, allowance made to correct for overflow, and the resulting value of X is thus prepared for the relevant phase.

This process repeats until angles for all phases have been calculated. Steps 66 and 67 determine whether the iteration is complete or whether to loop back to step 62 to add another phase offset. When iteration is complete, a new value of X is read from the encoder and the entire process repeats.

Figure 8:
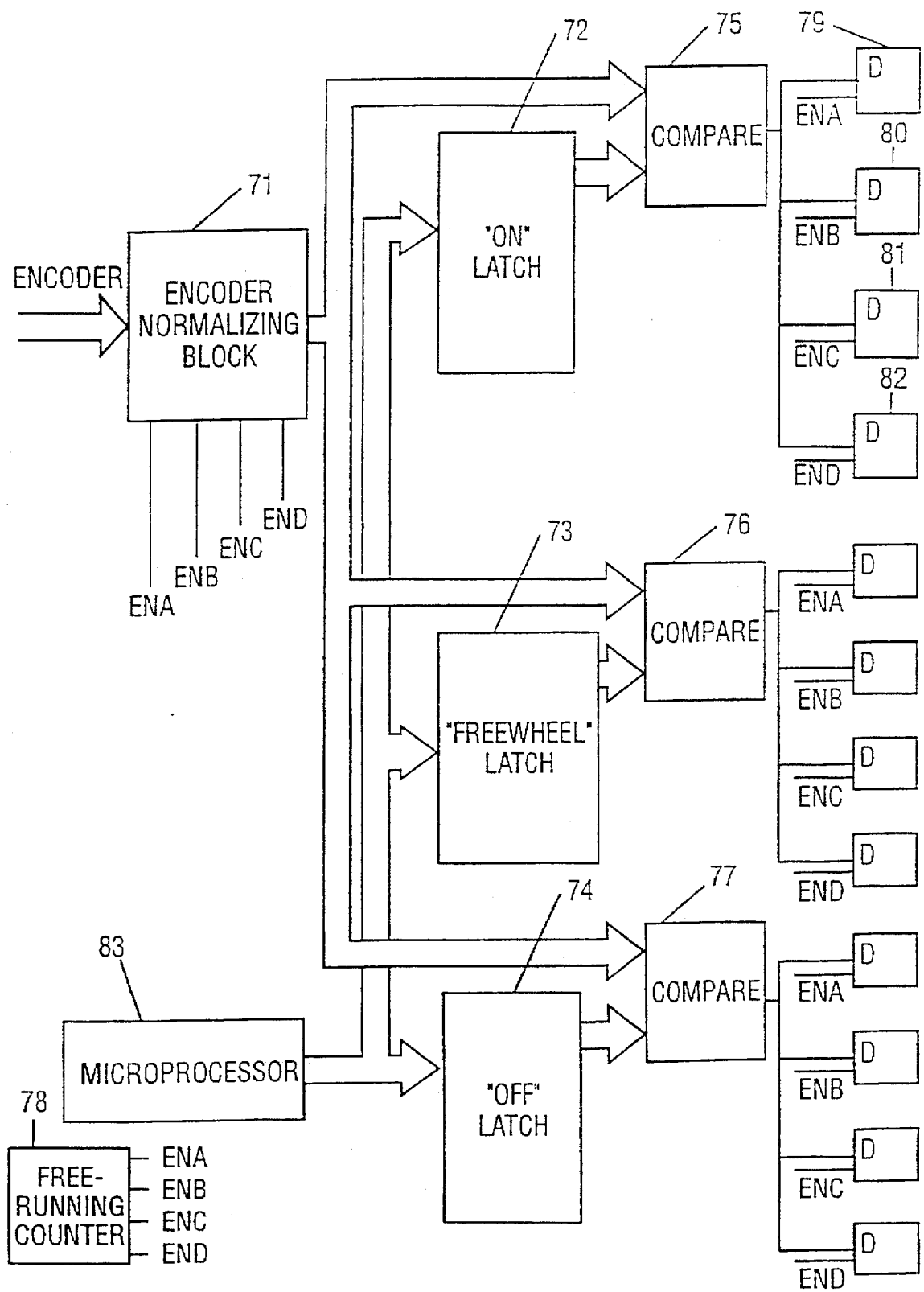
FIG. 8 is a block diagram of a phase energization controller using normalization circuitry of FIG. 9.

An angle comparison circuit is used to determine the angles at which one or more of the switches are operated. A possible circuit is shown in FIG. 8. The desired "on", "freewheel" and "off" angles are calculated, typically in a microprocessor, in terms of the encoder counts. These are then stored in three latches 72, 73, and 74, and updated periodically. The latch contents are compared with the normalized encoder value in digital comparators 75, 76, and 77. The outputs of comparators 75, 76, and 77 indicate whether the three reference points are exceeded, and thus the desired energization state of the transistors can be easily derived using simple gates.

The angle comparison circuit shown in FIG. 8 is typically time multiplexed, so that the same logic circuit can be used for all phases of the machine. FIG. 8 shows the arrangement for a four-phase motor. A free-running counter 78 produces four enable outputs in sequence, ENA, ENB, ENC, and END, one for each phase. As each phase is selected, the normalized encoder word for that phase is calculated in block 71, the comparison made by comparators 75, 76, or 77, and the three comparator outputs stored in flip-flops 79, 80, 81 or 82. There are separate flip-flops for each phase. Means must be provided for synchronizing the counter to the phase normalization circuit 71. The encoder value must not be allowed to change during calculations, and the counter period must be low enough to permit all values to settle. Several alternatives will be apparent to those skilled in the art.

Figure 9:
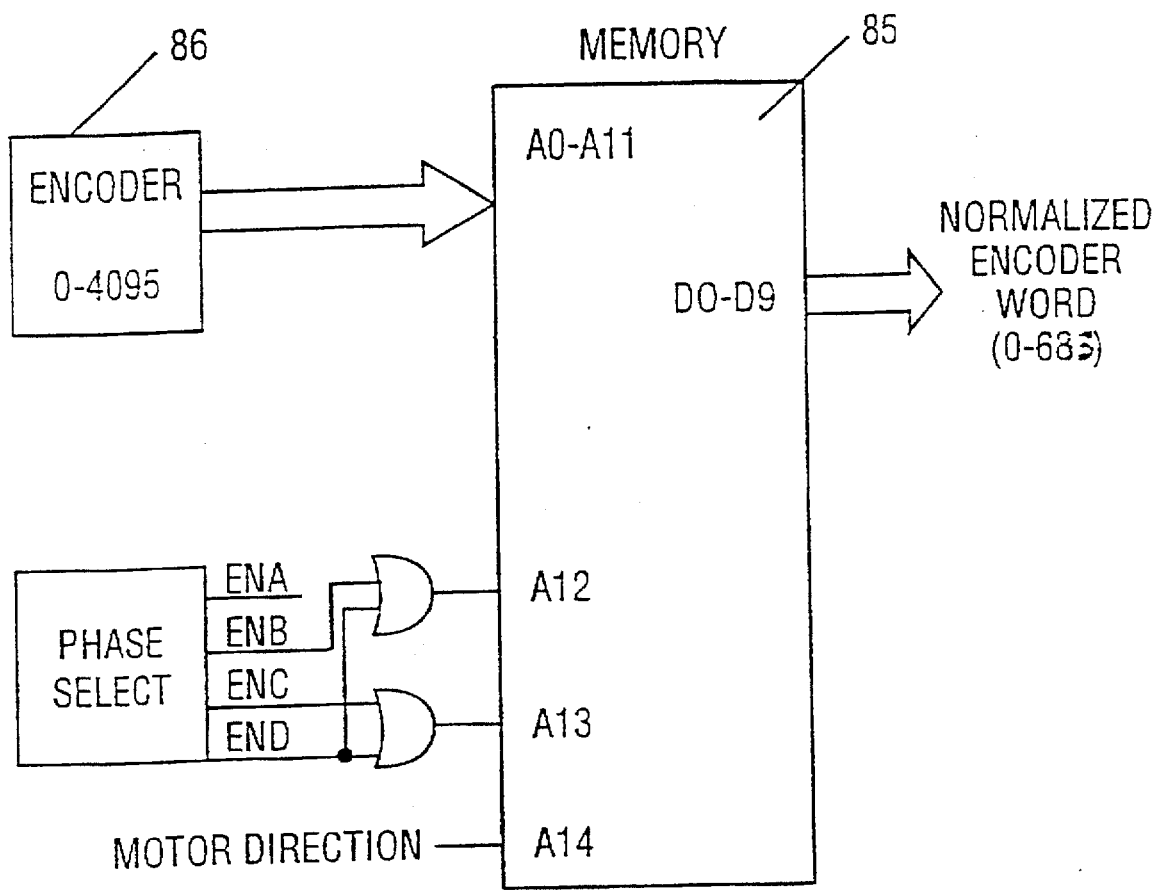
FIG. 9 is a block diagram embodiment of the normalization process.

The normalization process presented in the flowchart of FIG. 7 and represented by block 71 of FIG. 8 can be implemented in several ways. As shown in FIG. 9, the simplest method is to use a non-volatile memory device 85 (e.g. EPROMs) to store the output words corresponding to every combination of encoder state, machine phase, motor direction, and motoring/generating condition. Such a technique is fast and simple, and the contents of the memory can be calculated using FIG. 7 as the basis of the software algorithm. FIG. 9 shows the implementation for a typical four-phase machine. Here, a twelve-bit encoder 86 is used to provide the low order address lines to the memory, the four-phase enables ENA, ENB, ENC, and END are encoded to provide the next two address bits, and the motor direction signal provides the fifteenth bit. The memory output is a ten-bit word representing the normalized encoder values in the range 0–683 since this is for a machine with six rotor poles. Torque direction is allowed for by swapping phase outputs, as previously described.

Figure 10:
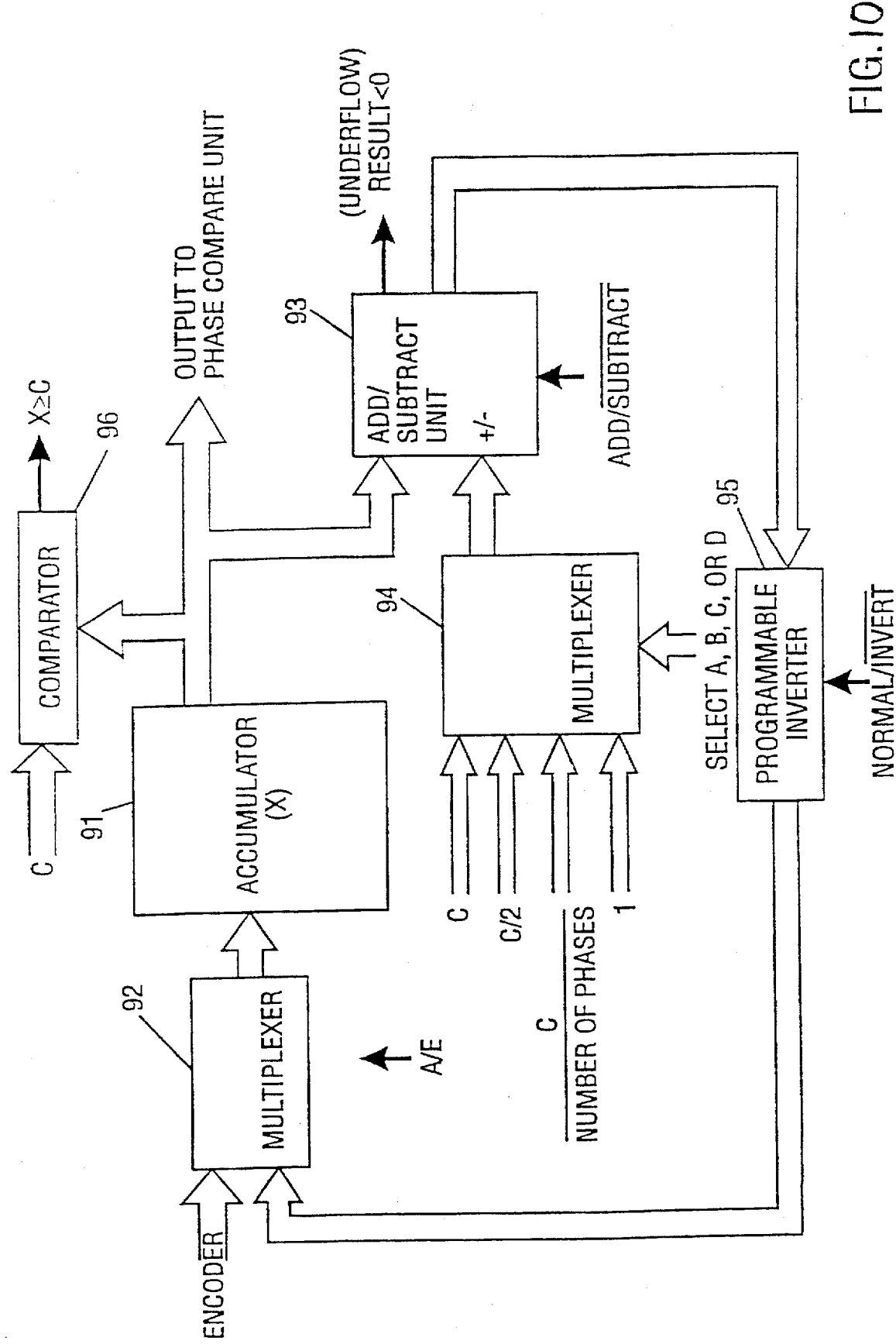
FIG. 10 is a block diagram of another embodiment of the flowchart of FIG. 7.

The memory embodiment of FIG. 9 is simple and efficient when used with standard components, but is less attractive if the circuit is to be implemented in an application-specific integrated circuit (AS1C). In this case, the preferred embodiment, shown in FIG. 10, is to calculate the encoder normalization steps and the overflow corrections using a digital arithmetic unit. The arrangement of FIG. 10 shows an efficient arrangement, although it will be appreciated that the details of this may easily be changed by one skilled in the art. At the start of the normalization process the current encoder state is loaded into the accumulator 91 through the multiplexer 92. The add/subtract unit 93 has one input word passed from the accumulator 91, whilst the other is connected to a multiplexer 94. This arrangement gives the possibility of adding or subtracting the values 1, C, C/2, or C/(number of phases) to the value X in the accumulator. The output of the add/subtract unit 93 is routed back to the accumulator 92 through a word-wide exclusive-OR unit 95, the latter being used to selectively invert the adder word.

Inspection of the flowchart of FIG. 7 shows that the arithmetic arrangement described above is capable of providing all of the arithmetic functions needed in the algorithm. The one function which is not obvious is the calculation of X=C−X. This is achieved by inverting the add/subtract unit 93 output as it is passed back to the accumulator 91 from the previous step, adding one to the accumulator contents, giving the 2's complement of the original value, then adding C.

A comparator 96 is provided to determine whether the accumulator is greater than or equal to C, and the add/subtract unit 93 has an underflow detect to see if the result of a calculation is less than zero. These two condition flags are used to control the calculation flow according to the flowchart of FIG. 7.

An alternative method of normalization may provide for simplified circuits, particularly in drives where the motor direction is not expected to change. In this case, the absolute encoder state is not normally used directly. Instead, a change of state is used to increment counters, of which there is typically one per phase. Each counter is allowed to increment until it reaches the maximum count for an electrical cycle, C, when it is reset. Hence, if the counters are initialized to represent the normalized encoder state for each phase corresponding to the actual encoder state at that time, then they will subsequently track the normalized count for the phase. The system is complicated by the need to allow for direction changes and motoring/generating conditions, and it is considered a wise precaution to have periodic checks in case of tracking errors.

Figure 11:
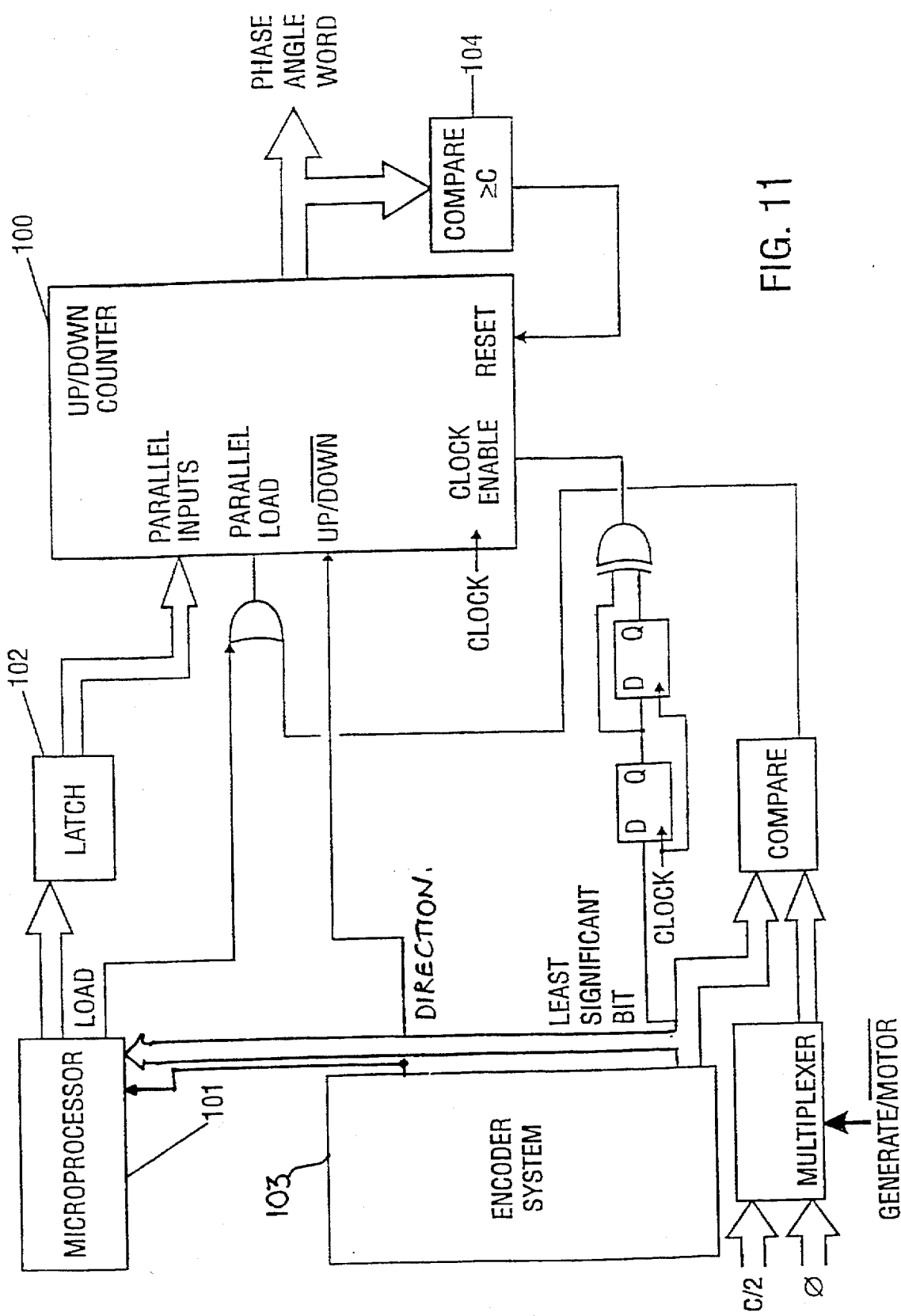
FIG. 11 is a block diagram embodiment of an alternate normalization process.

FIG. 11 shows a typical implementation of this alternative system. Only one phase is shown on FIG. 11, although the logic is simply repeated for other phases, apart from the encoder comparison circuit, of which only one is needed. The implementation shown on FIG. 11 uses synchronous logic, although asynchronous circuits could easily be used.

The up/down counter 100 is a counter which has a maximum value equal to or exceeding C. It has a clock enable input which enables the counter to increment by one count for each change of state of the encoder word, a direction control signal which controls the direction of count, a parallel load input, and an input to reset the count to zero.

The system is initialized by the microprocessor 101 reading the encoder state and calculating the normalized encoder values for each phase, loading these into the phase latch 102, then forcing a parallel load of the counter 100 from the latch 102. The processor 101 then reloads the latch 102 with the normalized phase value corresponding to an encoder count of zero, but does not force a parallel load.

If the drive is operating in the forward direction, then the encoder system 103 sets the counter 100 to count up. Each edge of the least significant bit of the encoder 103 causes all of the phase counters 100 to increment. As the counter 100 reaches a count of C it resets itself. This operation is represented by block 104. Thus, the counter 100 continues to hold the normalized count for the phases. As the encoder passes through zero (normally set to the aligned position of the first phase), then all of the phase counters 100 are loaded in parallel from the latches 102. Hence, the phase counts are realigned to the absolute encoder position once per mechanical cycle. The drive may be set to generating mode by loading the latches in parallel at an encoder offset of C/2. This involves a delay of up to one mechanical cycle before generating commences. If such a delay is not acceptable, then the microprocessor 101 can calculate the latch values for the current encoder position and force these to be loaded immediately.

A motor direction change is detected in the encoder system 103, and this causes the counter direction to change. If the motor is unidirectional, then no further action is needed. However, if the motor is to operate in either direction, then a direction change should force a processor interrupt and thus the counters can be loaded with the values appropriate to the encoder state, the direction, and the motoring/generating state of the machine.

Figure 12:
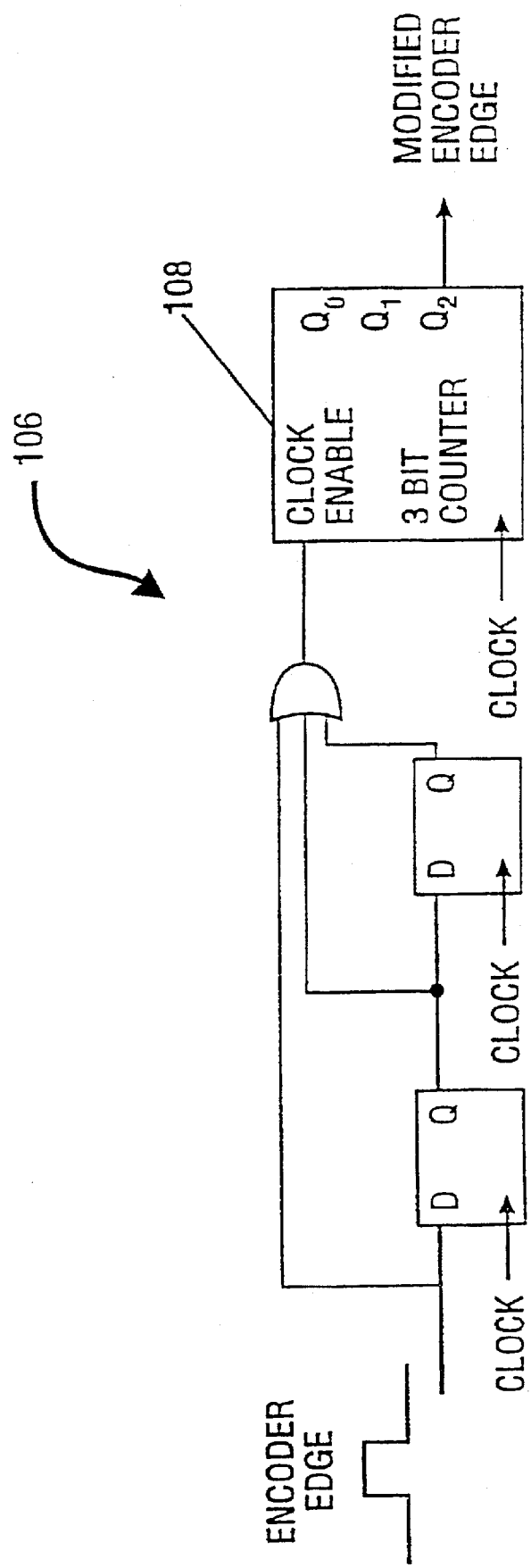
FIG. 12 is a block diagram of a circuit which may be used to simplify the embodiment shown in FIG. 11.

Simplifications are possible to the arrangement of FIG. 11 which reduce the amount of logic circuits needed. For a twelve-bit encoder on a four-phase motor with six rotor poles, C=682⅔. If the encoder pulses are passed through a multiply-by-three and divide-by-eight circuit 106 as shown in FIG. 12, then the electrical cycle consists of 256 counts. The clock enable of a three bit counter 108 remains high for three successive clock signals. As a result, the three bit counter 108 counts three times for each encoder edge. At the conclusion of three edges, an output pulse will be produced at the most significant bit $Q_2$ of the three bit counter 108. It is thus possible to simplify FIG. 11 to use a single counter 100 for all four phases, with only a small amount of decoding on the two most significant bits to modify the counter output for each phase.

Figure 13:
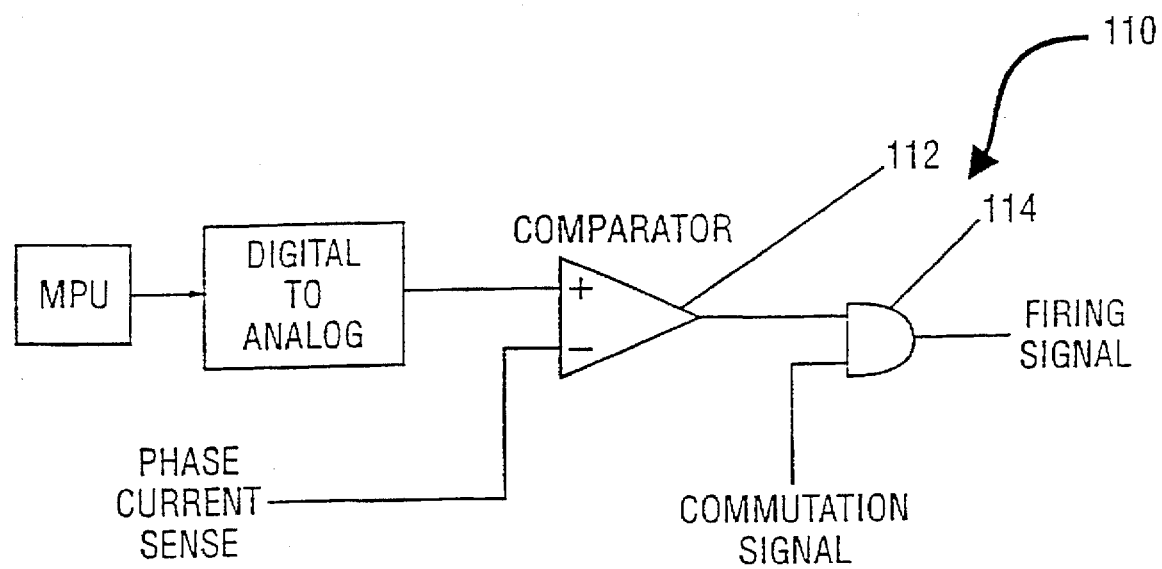
FIG. 13 is a block diagram of an overcurrent detector for the phase energization controller of FIG. 8.

In practice, the phase energization controller preferably includes an overcurrent detector and circuitry to ensure a minimum "off" time for preventing very high switching rates. FIG. 13 shows an over-current detector 110 that can be utilized with the phase energization controller of the present invention. The over-current detector 110 receives a threshold current value which is input into comparator 112. The comparator 112 also receives a phase current sensor signal representing the current level through the phase. In this particular embodiment, the output of the comparator 112 is received by an AND gate 114, and the AND gate 114 also receives the commutation signal (such as an "ON" signal from the phase energization controller of FIG. 8). If the phase current exceeds the predetermined threshold level, the overcurrent detector 110 switches off the switches.

The present invention can also utilize initialization circuitry to avoid having to mechanically align the encoder with the phases of the machine. This initialization technique involves energizing one or more phases continuously to set the rotor to a known position, reading the position encoder at the known point to obtain an initialization value, and henceforth subtracting the initialization value from the encoder reading when determining rotor angles.

Thus, the phase energization controller of the present invention provides more efficient and accurate detection of the various commutation points for the phases of a switched reluctance motor. Those skilled in the art will readily recognize that these and various other modifications and changes may be made to the present invention without strictly following the exemplary applications illustrated and described herein and without departing from the true spirit and scope of the present invention, which is set forth in the following claims.

What is claimed is:

1. A normalization device for a switched reluctance machine including a rotor and defining a plurality of phases, the normalization device comprising a circuit which receives a signal from the switched reluctance machine representing a rotor position angle, the normalization circuit producing a signal representing a normalized rotor position angle of the switched reluctance machine wherein the normalized signal is obtained by reducing the signal representing the rotor position angle to that of a single electrical cycle and modifying the signal according to the phase being considered, a desired rotor direction, and an actual rotor direction.

2. The normalization circuit of claim 1 wherein said normalized signal is obtained by adding or subtracting an offset according to the phase being considered, the desired torque direction, and the machine direction.

3. The normalization device of claim 1 wherein the circuit includes a storage device including digital data representing a plurality of precalculated normalized rotor position angles stored therein, the storage device outputting a signal representing normalized rotor position angles in response to the signal representing the rotor position angle to produce the normalized rotor position angle.

4. The normalization device of claim 1 wherein the circuit includes an accumulator for storing the signal representing the rotor position angle, an add/subtract unit coupled to the accumulator for adding and subtracting selected values to the signal representing the rotor position angle contained in the accumulator, and a comparator coupled to the accumulator to compare whether the accumulator value exceeds a predetermined value.

5. The normalization device of claim 4 wherein the signal representing the rotor position is expressed in digital counts, and wherein the predetermined value is the number of counts in one electrical cycle.

6. The normalization device of claim 1 wherein the circuit includes a counter which is incremented upon a change in the signal representing the rotor position angle until said counter reaches a predetermined value.

7. The normalization device of claim 6 wherein the counter further includes means for initializing said counter.

8. The normalization circuit of claim 1 wherein the normalized rotor position angle is produced for each phase.

9. An angle controller for a switched reluctance machine having a rotor and defining a plurality of phases, said angle controller receiving from a position encoder a rotor angle value representing a rotor position, the angle controller comprising:

normalization circuitry converting the rotor angle value to a normalized angle value;

a storage device storing commutation angles for each phase, the commutation angles defining a predetermined switching configuration for each phase; and a comparator arrangement for comparing the commutation angles and the normalized angle values, the comparator arrangement determining when the predetermined switching configuration occurs for each phase.

10. An initialization circuit for a switched reluctance machine including a rotor, a plurality of phases and a position encoder that produces rotor angle values according to positions of the rotor, the initialization circuit energizing at least one phase of the switched reluctance machine to move the rotor of the machine from a stationary position to a preferred position, the initialization circuit reading the position encoder to determine the position of the rotor, and when the rotor is at a predetermined position, determining an offset value.

11. An angle controller for a switched reluctance machine having a rotor and defining a plurality of phases, the angle controller receiving from a position encoder a rotor angle value representing a rotor position angle, the angle controller comprising:

initialization circuitry to energize one or more phases of the switched reluctance machine to set the rotor of the machine to a preferred position and read the position encoder when the rotor is at the preferred position from which to obtain an initialization value, the initialization circuit determining an offset value which may subsequently be used to determine the rotor angle value;

normalization circuitry converting the rotor angle value to a normalized angle value;

a storage device storing commutation angles for each phase, the commutation angles defining a predetermined switching configuration for each phase; and a comparator arrangement for comparing the commutation angles and the normalized angle values, the comparator arrangement determining when the predetermined switching configuration occurs for each phase.

12. A method for normalizing a rotor angle value in a switched reluctance machine including a rotor and an encoder which provides rotor angle values representing angular positions of the rotor, the switched reluctance machine defining a plurality of phases and a plurality of electrical cycles, the method comprising the steps of reading the rotor angle value provided by the encoder;

reducing the rotor angle value to an equivalent rotor angle of a single electrical cycle; and adding an offset rotor angle value corresponding to a phase of the switched reluctance machine.

13. A method for controlling a switched reluctance machine including a rotor and a position encoder which outputs a rotor angle value representing a rotor position angle, the switched reluctance machine defining a plurality of phases, the method comprising the steps of:

energizing one or more phases of the switched reluctance machine to set the rotor of the machine to a preferred position and reading the position encoder when the rotor is at the preferred position, and determining an offset value;

converting the rotor angle value to a normalized rotor angle value of the switched reluctance machine;

storing commutation angles, said commutation angles defining a predetermined switching configuration; and comparing the commutation angles and the normalized angle values to determine when the predetermined switching configuration occurs for the current phase.

14. A rotor position normalizer for a switched reluctance machine having a rotor defining n rotor poles, a stator and at least one phase winding defining at least one phase, the machine having an electrical cycle angle of 360/n°, the normalizer comprising: processing means arranged to receive a rotor position signal indicative of a rotor position angle and to produce a signal indicative of a normalized rotor position angle within a normalized electrical cycle of the machine, wherein the normalized signal is obtained by reducing the signal representing the rotor position angle to a signal corresponding to that of a single electrical cycle and modifying the normalized signal according to the phase being considered, a desired rotor direction, and an actual rotor direction.

15. A rotor position normalizer for a switched reluctance machine having a rotor defining n rotor poles, a stator and at least one phase winding defining at least one phase, the machine having an electrical cycle angle of 360/n°, the normalizer comprising: processing means arranged to receive a rotor position signal indicative of a rotor position angle and to produce a signal indicative of a normalized rotor position angle within a normalized electrical cycle of the machine, the processing means comprising a comparator arranged to compare the rotor position signal with a signal indicative of the electrical cycle angle and means for subtracting the signal indicative of the electrical cycle angle from said rotor position signal.

16. A rotor position normalizer for a switched reluctance machine having a rotor defining n rotor poles, a stator and at least one phase winding defining at least one phase, the machine having an electrical cycle angle of 360/n°, the normalizer comprising: processing means arranged to receive a rotor position signal indicative of a rotor position angle and to produce a signal indicative of a normalized rotor position angle within a normalized electrical cycle of the machine, the processing means comprising a comparator arranged to compare the rotor position signal with a signal indicative of the electrical cycle angle and means for repeatedly subtracting the signal indicative of the electrical cycle angle from the rotor position signal until the resultant signal corresponds to an angle which is less than or equal to the electrical cycle angle.

17. A rotor position normalizer for a switched reluctance machine having a rotor defining n rotor poles, a stator and at least one phase winding defining at least one phase, the machine having an electrical cycle angle of 360/n°, the normalizer comprising: processing means arranged to receive a rotor position signal indicative of a rotor position angle and to produce a signal indicative of a normalized rotor position angle within a normalized electrical cycle of the machine, the processing means including look-up means storing values of normalized rotor position angles for different rotor position signals.

18. A switched reluctance drive system comprising a switched reluctance machine including a rotor defining n rotor poles, a stator, at least one phase winding defining at least one phase, rotor position indicator means for providing a rotor position signal indicative of a rotor position angle, switch means and a machine controller for controlling actuation of the switch means, the switched reluctance machine having an electrical cycle angle of 360/n°, the controller comprising: a normalizer having processing means arranged to receive the rotor position signal and to produce a signal indicative of a normalized rotor position angle within a normalized electrical cycle of the machine, wherein the normalized signal is obtained by reducing the signal representing the rotor position angle to a signal representing that of a single electrical cycle and modifying the normalized signal according to the phase being considered, a desired rotor direction, and an actual rotor direction.

19. A switched reluctance drive system comprising a switched reluctance machine including a rotor defining n rotor poles, a stator, at least one phase winding defining at least one phase, rotor position indicator means for providing a rotor position signal indicative of a rotor position angle, switch means and a machine controller for controlling actuation of the switch means, the switched reluctance machine having an electrical cycle angle of $360/n°$, the controller comprising: a normalizer having processing means arranged to receive the rotor position signal and to produce a signal indicative of a normalized rotor position angle within a normalized electrical cycle of the machine, the processing means comprising a comparator arranged to compare the rotor position signal with a signal indicative of the electrical cycle angle and means for subtracting the signal indicative of the electrical cycle angle from the rotor position signal.

20. A switched reluctance drive system comprising a switched reluctance machine including a rotor defining n rotor poles, a stator, at least one phase winding defining at least one phase, rotor position indicator means for providing a rotor position signal indicative of a rotor position angle, switch means and a machine controller for controlling actuation of the switch means, the switched reluctance machine having an electrical cycle angle of $360/n°$, the controller comprising: a normalizer having processing means arranged to receive the rotor position signal and to produce a signal indicative of a normalized rotor position angle within a normalized electrical cycle of the machine, the processing means comprising a comparator arranged to compare the rotor position signal with a signal indicative of the electrical cycle angle and means for repeatedly subtracting the signal indicative of the electrical cycle angle from the rotor position signal until the resultant signal corresponds to an angle which is less than or equal to the electrical cycle angle.

21. A switched reluctance drive system comprising a switched reluctance machine including a rotor defining n rotor poles, a stator, at least one phase winding defining at least one phase, rotor position indicator means for providing a rotor position signal indicative of a rotor position angle, switch means and a machine controller for controlling actuation of the switch means, the switched reluctance machine having an electrical cycle angle of $360/n°$, the controller comprising: a normalizer having processing means arranged to receive the rotor position signal and to produce a signal indicative of a normalized rotor position angle within a normalized electrical cycle of the machine, the processing means comprising a comparator arranged to compare the rotor position signal with a signal indicative of the electrical cycle angle, means for repeatedly subtracting the signal indicative of the electrical cycle angle from the rotor position signal until the resultant signal corresponds to an angle which is less than or equal to the electrical cycle angle, and look-up means storing values of normalized rotor position angles for different rotor position signals.

22. A switched reluctance drive system comprising a switched reluctance machine including a rotor defining n rotor poles, a stator, at least one phase winding defining at least one phase, rotor position indicator means for providing a rotor position signal indicative of a rotor position angle, switch means and a machine controller for controlling actuation of the switch means, the switched reluctance machine having an electrical cycle angle of $360/n°$, the controller comprising: a normalizer having processing means arranged to receive the rotor position signal and to produce a signal indicative of a normalized rotor position angle within a normalized electrical cycle of the machine, the controller further including offsetting means for offsetting the normalized rotor position angle by half an electrical cycle, the offsetting means including inverter means for inverting the normalized rotor position angle, the inverter means being selectable in response to the switched reluctance machine operating as a motor or a generator.

23. A switched reluctance drive system comprising a switched reluctance machine including a rotor defining n rotor poles, a stator, at least one phase winding defining at least one phase, rotor position indicator means for providing a rotor position signal indicative of a rotor position angle, switch means and a machine controller for controlling actuation of the switch means, the switched reluctance machine having an electrical cycle angle of $360/n°$, the controller comprising: a normalizer having processing means arranged to receive the rotor position signal and to produce a signal indicative of a normalized rotor position angle within a normalized electrical cycle of the machine, the rotor position indicator means including direction indicator means for producing a signal indicative of a direction of rotation of the rotor, the processing means being arranged to subtract the rotor position signal from the signal indicative of the electrical cycle angle when the rotor is rotating in a predetermined direction.

24. A switched reluctance drive system comprising a switched reluctance machine including a rotor defining n rotor poles, a stator, at least one phase winding defining at least one phase, rotor position indicator means for providing a rotor position signal indicative of a rotor position angle, switch means and a machine controller for controlling actuation of the switch means, the switched reluctance machine having an electrical cycle angle of $360/n°$, the controller comprising: a normalizer having processing means arranged to receive the rotor position signal and to produce a signal indicative of a normalized rotor position angle within a normalized electrical cycle of the machine, the rotor position indicator means including direction indicator means for producing a signal indicative of a direction of rotation of the rotor, the processing means being arranged to subtract the rotor position signal from the signal indicative of the electrical cycle angle when the rotor is rotating in a predetermined direction, the processing means including means for adding the rotor position signal to the signal indicative of the electrical cycle angle when the signal indicative of the normalized rotor position angle corresponds to an angle less than zero.

25. A switched reluctance drive system comprising a multi-phase switched reluctance machine including a rotor defining n rotor poles, a stator, at least one phase winding defining at least one phase, rotor position indicator means for providing a rotor position signal indicative of a rotor position angle, switch means and a machine controller for controlling actuation of the switch means, the switched reluctance machine having an electrical cycle angle of $360/n°$, the controller comprising: a normalizer having processing means arranged to receive the rotor position signal and to produce a signal indicative of a normalized rotor position angle within a normalized electrical cycle of the machine, the system further including means for counting the phases and means for selecting the switch means for each phase in sequence.

26. A switched reluctance drive system comprising a switched reluctance machine including a rotor defining eight rotor poles, a stator, three phase windings defining three phases, rotor position indicator means for providing a rotor position signal indicative of a rotor position angle, switch means and a machine controller for controlling actuation of the switch means, the switched reluctance machine having an electrical cycle angle of 360/n°, the controller comprising: a normalizer having processing means arranged to receive the rotor position signal and to produce a signal indicative of a normalized rotor position angle within a normalized electrical cycle of the machine, the rotor position signal comprising a digital word having a plurality of bits, the system including derivation means normalizing the rotor position signal by discarding the three most significant bits of the rotor position signal.

27. A switched reluctance drive system comprising a switched reluctance machine including a rotor defining n rotor poles, a stator, three phase windings defining three phases, rotor position indicator means for providing a rotor position signal indicative of a rotor position angle, switch means and a machine controller for controlling actuation of the switch means, the switched reluctance machine having an electrical cycle angle of 360/n°, the controller comprising: a normalizer having processing means arranged to receive the rotor position signal and to produce a signal indicative of a normalized rotor position angle within a normalized electrical cycle of the machine, the controller further including offsetting means for offsetting the normalized rotor position angle by half an electrical cycle, the offsetting means including inverter means for inverting the normalized rotor position angle, the inverter means being selectable in response to the switched reluctance machine operating as a motor or a generator, the inverter means being arranged to perform a 2's complement operation on a digital version of the rotor position signal.

28. A method for normalizing the timing of switching in a switched reluctance machine having a rotor defining n rotor poles, a stator and at least one phase winding defining at least one phase, each phase having an electrical cycle angle of 360/n°, the method comprising:

receiving a rotor position signal indicative of rotor position; comparing the rotor position with the electrical cycle angle; and subtracting the electrical cycle angle from the rotor position to calculate a normalized rotor position signal.

29. A method as claimed in claim 28, including repeatedly subtracting the electrical cycle angle from the rotor position until the resultant angle is less than the electrical cycle angle.

30. A method as claimed in claim 28, including storing a digital signal indicative of a at least one normalized rotor position angle in a look-up table.

31. A method as claimed in claim 30, including the step of accessing the stored digital signals from the look-up table in response to the rotor position signals.

32. A method as claimed in claim 28, further including offsetting the normalized rotor position angle by half an electrical cycle, the offsetting including selectively inverting the normalized rotor position angle in response to the machine operating as a motor or a generator.

33. A method as claimed in claim 28, including producing a signal indicative of the sense of rotation of the rotor and subtracting the rotor position from the electrical cycle angle when the rotor is rotating in a predetermined direction.

34. A method as claimed in claim 33, further comprising the step of adding the rotor position signal to the electrical cycle angle when the rotor is rotating in the predetermined direction and the normalized rotor position angle is less than zero.

35. A method as claimed in claim 28, including the step of determining the current motor phase and selecting the switch means for each phase for actuation in sequence according to the current phase.

36. A method as claimed in claim 30 wherein the machine defines three phases and the rotor defines eight rotor poles, and wherein the rotor position signal comprises a digital word having a plurality of bits, the subtracting step comprising discarding the three most significant bits of the rotor position signal.

37. A method as claimed in claim 32 wherein the machine defines three phases, the inverting act comprising performing a 2's complement operation on a digital version of the rotor position signal.

* * * * *

UNITED STATES PATENT AND TRADEMARK OFFICE
CERTIFICATE OF CORRECTION

PATENT NO. : 5,894,210
DATED : April 13, 1999
INVENTOR(S) : Geoffrey Thomas Brown, Michael James Turner andPol Remi Avet It is certified that error appears in the above-identified patent and that said Letters Patent is hereby corrected as shown below:

On the title page under [56] References Cited, Foreign Patent Documents, please insert the following references therefor.

| | | |
|---|---|---|
| 94/01919 | 1/1994 | WIPO |
| 534761 | 3/1993 | United Kingdom |
| 90/00325 | 1/1990 | WIPO |
| 378351 | 7/1990 | United Kingdom |
| 273052 | 7/1988 | United Kingdom |
| 239026 | 9/1987 | United Kingdom |

On the title page under [56] References Cited, Other Publications, please insert the following publications therefor.

D.W.J. Pulle, et al., "A New Magnetoresistive Based Sensor For Switched Reluctance Drives," PECS '92, Vol. 2, June 29, 1992 – July 3, 1992, Toledo, Spain Dr. J.M. Stephen, Dr. R.J. Blake, "The Charzcteristics, Design And Applications Of Switched Reluctance Motors And Drives," Pages 1-68, June 21-24, 1993 Conference and Exhibition, Seminar 5.

Signed and Sealed this

Fourth Day of January, 2000

Attest:

Attesting Officer

*Acting Commissioner of Patents and Trademarks*

UNITED STATES PATENT AND TRADEMARK OFFICE
CERTIFICATE OF CORRECTION

PATENT NO.   : 5,894,210
DATED        : April 13, 1999
INVENTOR(S)  : Geoffrey Thomas Brown, Michael James Turner, Pol Remi Avet It is certified that error appears in the above-identified patent and that said Letters Patent is hereby corrected as shown below:

<u>Title page,</u>
Item [56], References Cited,
FOREIGN PATENT DOCUMENTS, please insert the following references:

-- 94/01919   01/94   WIPO
   534761    03/93   Europe
   90/00325  01/90   WIPO
   378351    07/90   Europe
   273052    07/88   Europe
   239026    09/87   Europe --

OTHER PUBLICATIONS, please insert the following references:

-- D.W.J. Pulle, et al., "A New Magnetoresistive Based Sensor for Switched Reluctance Drives," PESC '92, Vol. 2, June 29, 1992 - July 3, 1992, Toledo, Spain.

Dr. J.M. Stephen, Dr. R.J. Blake, "The Characteristics, Design And Applications Of Switched Reluctance Motors And Drives", Page 1-68, June 21-24, 1993 Conference and Exhibitions, Seminar 5. --

This certificate supersedes Certificate of Correction issued January 4, 2000.

Signed and Sealed this

Fifth Day of February, 2002

*Attest:*

JAMES E. ROGAN
*Attesting Officer*          *Director of the United States Patent and Trademark Office*